UNITED STATES PATENT OFFICE.

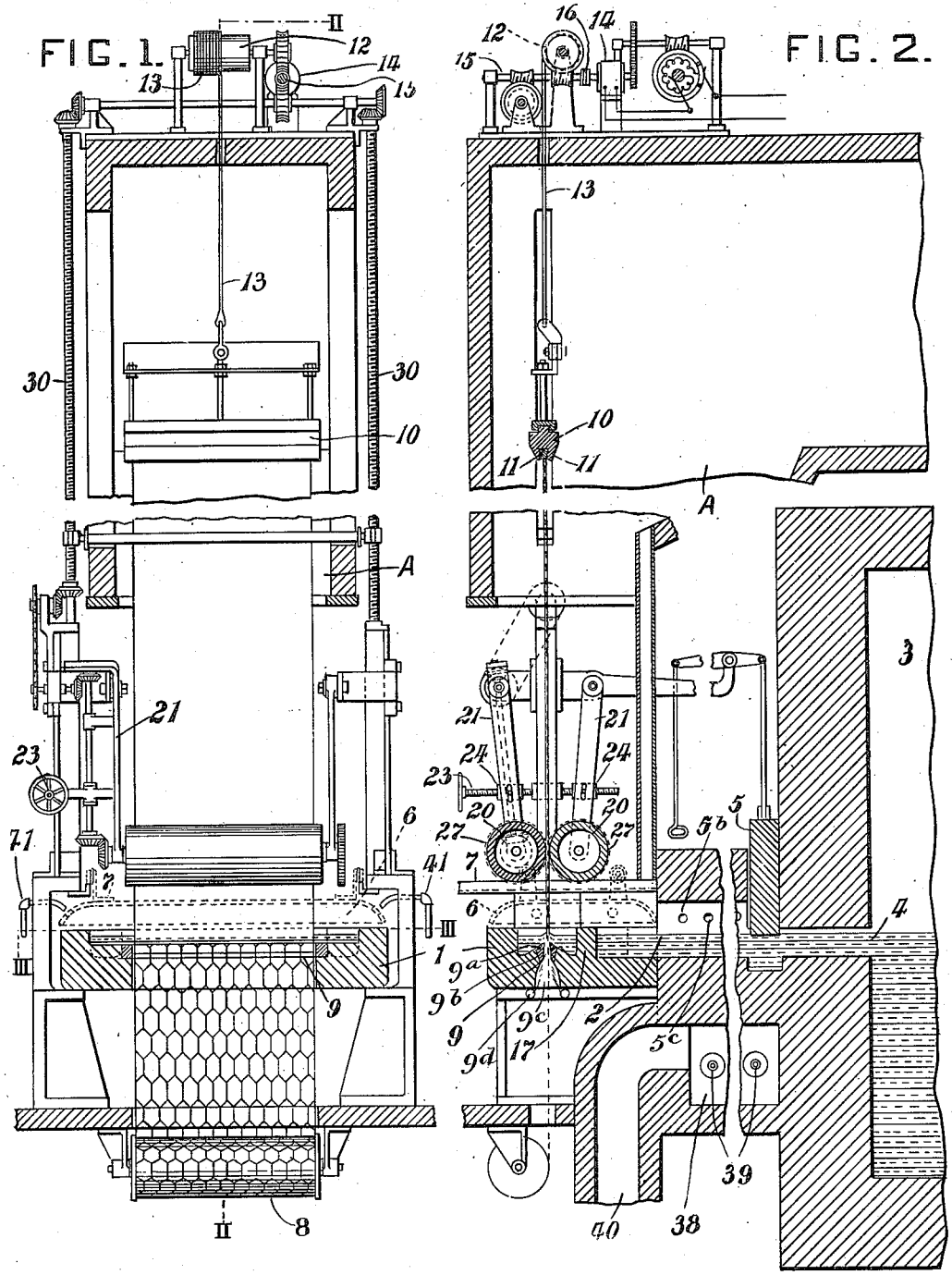

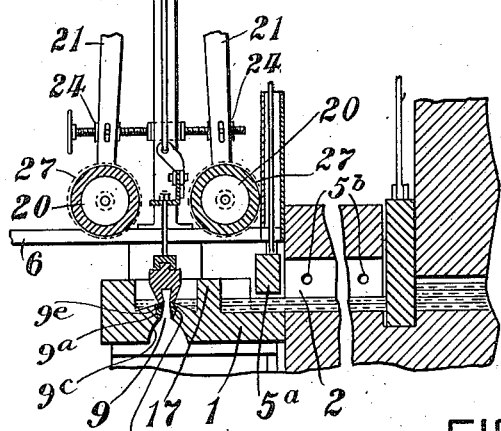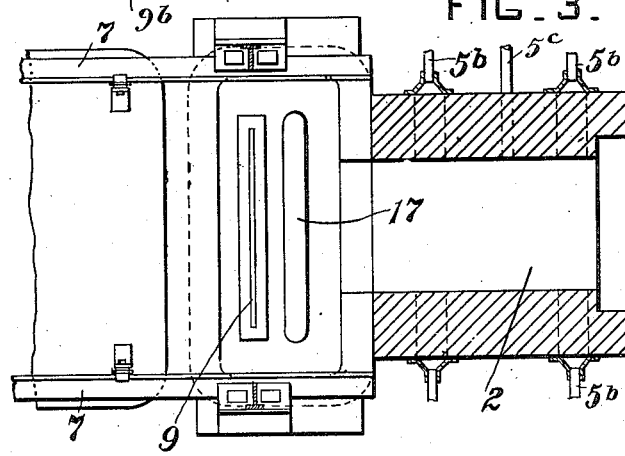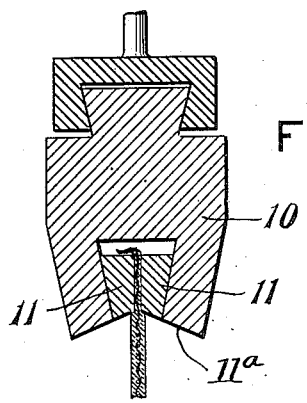

FRANK L. O. WADSWORTH, OF SEWICKLEY, PENNSYLVANIA.

MANUFACTURE OF GLASS SHEETS.

1,161,913.

Specification of Letters Patent.

Patented Nov. 30, 1915.

Application filed April 13, 1909. Serial No. 489,572.

*To all whom it may concern:*

Be it known that I, FRANK L. O. WADSWORTH, residing at Sewickley, in the county of Allegheny and State of Pennsylvania, a citizen of the United States, have invented or discovered certain new and useful Improvements in the Manufacture of Glass Sheets, of which improvements the following is a specification.

The invention described herein relates to certain improvements in the manufacture of glass sheets having a metallic reinforcement embedded therein and the invention has for its object the simultaneous application of layers of glass to both sides of the metallic reinforcement, which is caused to move through a body of molten glass and leave the same in a direction substantially at right angles to the surface of such body.

The invention is hereinafter more fully described and claimed.

In the accompanying drawings forming a part of this specification Figure 1 is a sectional elevation showing a portion of a glass melting furnace, a receptacle connected to the furnace and apparatus for drawing a wire mesh through the receptacle. Fig. 2 is a sectional elevation on a plane indicated by the line II—II Fig. 1. Fig. 3 is a sectional plan view on a plane indicated by the line III—III Fig. 1. Fig. 4 is a sectional view showing the glass receptacle and a portion of the drawing apparatus at the beginning of the operation. Fig. 5 is a detail view showing the bait.

In the practice of my invention a pot or receptacle 1 having an inlet port 2 is held against the forehearth of the furnace 3 with said port in register with an inlet passage 4 in the forehearth. The flow of glass through this passage to the pot is controlled by a gate 5. A second gate 5ª may be employed adjacent to the end of the outlet passage, thus forming a closed chamber in which the glass may be further heated if necessary.

By lowering the gates 5, 5ª, so that their lower ends will be submerged in the glass, the admission of air under pressure into this chamber through the pipe 5ᶜ will force the glass under the gates and out of the chamber, thus diminishing the depth of the glass in the chamber, which will be of advantage in case it is desired to heat it to a high temperature by means of the burners 5ᵇ.

A cover 6 for the pot is movably supported on rails 7 permitting of the shifting of the cover back and forth as circumstances may require.

The reinforce fabric is caused to enter the glass in the pot 1 and to leave it at a different point in a direction substantially at right angles to the surface of the glass. In the construction shown in Figs. 1, 2, 3, and 4 the fabric, in short or long sections, is preferably wound on a reel 8 arranged below the pot and the end of the section is passed up through a slot 9 in the bottom of the pot. After being inserted through this slot the end of the fabric is secured to a suitable clamping device, such for example as that shown in Fig. 5, consisting of a block 10 of refractory material having a dovetailed groove at its lower side in which the end of the fabric is secured by means of wedge blocks 11. This pulling block 10 is provided with suitable means for attachment to a hoisting mechanism, such for example as that shown consisting of a drum 12, around which is wound the rope 13 having its end connected to the pulling block. The drum is driven in any suitable manner, preferably by means of a motor 14 through the medium of a worm and gear, the worm being detachably connected to the armature shaft 15 by a clutch mechanism 16.

At the beginning of the operation the block 10 having the end of the fabric secured therein is lowered down so as to cover the slot in the pot 1 or to be slightly above the bottom of the pot. The lower faces of the block 10 and the wedge blocks 11 are inclined upwardly and inwardly from their outer edges, as indicated at 11ª Fig. 5, in order to form a grooved lower face adapted to fit over the top of the slot 9, so as to seal the slot before the drawing commences. The gate 5 is then raised permitting the glass to flow into the pot to a suitable depth. In order to insure uniform distribution of the glass an abutment or drum 17 is arranged in the pot between the slot and the inlet port 2, so that the glass is caused to flow around the ends of this abutment and to flow into the portion of the pot containing the slot in a direction substantially parallel to the sides of the fabric or sheet to be formed. As soon as a sufficient quantity of glass has flowed into the pot, the motor is started so as to pull up the block 10 and with it the fabric. As the fabric moves up through the slot the glass will adhere thereto, the thickness of layer thus adhering being dependent either upon the temperature of the glass or the rate of movement of the fabric or both.

It is desirable that the depth of glass immediately adjacent to the wire fabric or over the slot should be slight, so that there will be a material cooling of the glass adjacent to the plane of the fabric. This cooling should however be so localized that there will not be any interruption of flow of glass in against the fiber. To attain this end the bottom of the pot adjacent to the slot and forming the edges thereof is for a substantial distance around the slot raised up above the general level of the bottom of the pot, as shown at $9^a$, thus decreasing the depth of a substantial body of glass around the fabric, but insuring a sufficient depth away from the fabric and slot to insure a uniform flow of glass inwardly against the fabric. As shown in Figs. 1, 2 and 4, this raised portion $9^a$ is preferably formed of a block of fire-clay independent of the body of the pot and removable therefrom. The edges of the bottom of the block $9^a$ are shown, as tapering downwardly and inwardly, resting on a correspondingly inclined annular lip $9^b$ formed at the top of the orifice $9^c$ through the bottom of the pot. By this construction the block $9^a$ may easily be removed and replaced whenever desired. By provision of the burners $9^d$ the glass in the pot may be caused to flow readily down through the orifice $9^c$ when the block $9^a$ is removed, and the inclined annular lip $9^b$ be rendered clear of glass. These burners $9^d$ may also be employed, if necessary, to regulate the temperature of the block $9^a$ and the slot 9. The regulation of the temperature of the slot itself may also be effected by means of an electric resistance heater $9^e$ embedded in the block $9^a$, as indicated in Fig. 4.

In order to insure the production of sheets having smooth surfaces and of uniform thickness, rollers 20 may be arranged on opposite sides of the path of movement of the glass from the pot. These rollers are supported by arms 21 pivotally mounted on a suitable frame work above the pot. The rollers are moved toward and from the plane of movement of the sheet in any suitable manner, preferably by means of a right and left hand screw 23 held as against movement in the supporting frame and engaging nuts 24 on the arm 21. By means of this construction the rollers may be separated sufficiently to allow the block 10 to pass, as indicated in Fig. 4, and then be shifted back into the position shown in Fig. 2, in order to bear against the opposite surfaces of the sheet being drawn. These rollers can be rotated either by contact with the sheet or can be rotated positively.

In order to regulate the temperature of the glass flowing into the pot a chamber 38 is arranged under the forehearth and adjacent to the outlet passage, in which gas is introduced for combustion, through suitable pipes 39, the products of combustion passing out through a flue 40. The temperature of the glass can also be regulated if desired by means of burners 41 entering the outlet passage in the forehearth immediately above the level of the glass as shown in Fig. 1.

For maintaining the pot at the desired heated condition or for melting out any of the glass openings are made in the cover through which flames of gas can be introduced when the cover is over the pot.

It is characteristic of my improvement that the depth of the glass and consequently the mass, is reduced as it flows in toward and against the sides of the fabric or reinforcement and by reason of the reduction in depth and mass, there will be a reduction of temperature of the glass at the time of its adherence of the fabric. In the construction shown in Figs. 1 to 4 this reduction in mass is effected by raising the bottom of the pot adjacent to the slot as described.

I claim herein as my invention:

1. In an apparatus for drawing reinforced glass sheets, the combination with a receptacle provided with an opening in its bottom and a seat in said opening, of a plug removably mounted on said seat and provided with a slot therethrough for the passage of the reinforce, and means within the opening and beneath the seat for applying heat to the plug and seat.

2. In an apparatus for drawing reinforced glass sheets, the combination with a receptacle for the glass provided with an elongated slot for the passage of the reinforce, said slot having inclined walls, of a bait-carrying block having its lower face formed to coöperate with the walls of the slot and to seal the slot before the drawing commences.

In testimony whereof, I have hereunto set my hand.

FRANK L. O. WADSWORTH.

Witnesses:
CHARLES BARNETT,
FRANCIS J. TOMASSON.